US012721336B2

(12) United States Patent
Braden

(10) Patent No.: US 12,721,336 B2
(45) Date of Patent: Sep. 1, 2026

(54) FLEXIBLE WATERFOWL DECOY SYSTEM

(71) Applicant: Jacob Michael Braden, Webster, NY (US)

(72) Inventor: Jacob Michael Braden, Webster, NY (US)

(*) Notice: Subject to any disclaimer, the term of this patent is extended or adjusted under 35 U.S.C. 154(b) by 0 days.

(21) Appl. No.: 18/927,187

(22) Filed: Oct. 25, 2024

(65) Prior Publication Data

US 2025/0134094 A1 May 1, 2025

Related U.S. Application Data

(60) Provisional application No. 63/593,970, filed on Oct. 28, 2023.

(51) Int. Cl.
*A01M 31/06* (2006.01)

(52) U.S. Cl.
CPC .................................. *A01M 31/06* (2013.01)

(58) Field of Classification Search
CPC .............................. A01M 31/00; A01M 31/06
USPC ................................................................ 43/3
See application file for complete search history.

(56) References Cited

U.S. PATENT DOCUMENTS 710,433 A * 10/1902 Coudon ................ A01M 31/06 43/3
796,147 A * 8/1905 Reynolds ............. A01M 31/06 43/3
2,952,090 A * 9/1960 Pittenger ............... A01M 31/06 D22/125
5,074,071 A * 12/1991 Dunne .................. A01M 31/06 43/2
6,470,620 B1 * 10/2002 Acker ................... A01M 31/06 43/3
9,010,013 B2 * 4/2015 Smith ................... A01M 31/06 43/2
9,814,229 B1 11/2017 Flake, Jr. et al.
2003/0024146 A1 * 2/2003 Spady ................... A01M 31/06 43/3
2003/0183734 A1 * 10/2003 Barnes .................. A01M 31/06 248/188.6
2017/0202208 A1 7/2017 Beauchamp
2021/0186004 A1 * 6/2021 Giese .................... A01M 31/06
2023/0404063 A1 12/2023 Beauchamp
2024/0268370 A1 8/2024 Leschinsky

FOREIGN PATENT DOCUMENTS

CA 2275780 A1 * 12/2000 ............ A01M 31/06

* cited by examiner

*Primary Examiner* — Peter M Poon
*Assistant Examiner* — Danielle A Clerkley
(74) *Attorney, Agent, or Firm* — Michael J. Nickerson

(57) ABSTRACT

A decoy deployment system includes a hub; a first decoy arm operatively connected to the hub; a second decoy arm operatively connected to the hub; and a third decoy arm operatively connected to the hub. The first and second decoy arms are configured to move from an undeployed position to a deployed position. The hub includes a first decoy arm notch and a second decoy arm notch. The first decoy arm notch is configured to engage the first decoy arm and to secure the first decoy arm in a deployed position. The second decoy arm notch is configured to engage the second decoy arm and to secure the second decoy arm in a deployed position.

12 Claims, 14 Drawing Sheets

10

10

FLEXIBLE WATERFOWL DECOY SYSTEM

PRIORITY INFORMATION

This application claims priority from U.S. Provisional Patent Application, Ser. No. 63/593,970, filed on Oct. 28, 2023. The entire content of U.S. Provisional Patent Application, Ser. No. 63/593,970, filed on Oct. 28, 2023, is hereby incorporated by reference.

BACKGROUND

Most conventional waterfowl decoy deployment systems are used by hunters to attract waterfowl, such as ducks, so that wild waterfowl are attracted to the decoys and will be brought into shooting range. Many of the conventional waterfowl decoy deployment systems use submerged components that are spreadable when deploying and collapsible when retrieving. Such conventional deployment systems typically include a plurality of decoys tethered in some manner to one or more extendable and retractable arms.

An example of a conventional decoy deployment system is disclosed in U.S. Pat. No. 9,814,229. U.S. Pat. No. 9,814,229 discloses swimming decoy assemblies that include a motor, a decoy actuating arm drivingly engaged for rotation by the motor, and a decoy attached to the decoy actuating arm. The entire content of U.S. Pat. No. 9,814,229 is hereby incorporated by reference.

Another example of a conventional decoy deployment system is disclosed in Published US Patent Application Number 2017/0202208. Published US Patent Application Number 2017/0202208 discloses a waterfowl decoy deployment system includes a hub subsystem including a casing, a plurality of arms extending radially outward from the casing, and a plurality of waterfowl decoys. A waterfowl decoy is coupled to an arm. The waterfowl decoy deployment system also includes a thrust bar system. The thrust bar system includes a thrust bar coupled to a casing and thrust devices coupled to the thrust bar. The thrust devices are configured to rotate the thrust bar about an axis to induce a substantially circular motion to the casing and the waterfowl decoys. The entire content of Published US Patent Application Number 2017/0202208 is hereby incorporated by reference.

A further example of a conventional decoy deployment system is disclosed in Published US Patent Application Number 2021/0186004. Published US Patent Application Number 2021/0186004 discloses a decoy buoy for holding waterfowl decoys that comprises a central hub with at least three arms comprising mounting holes generally equally spaced along the arms. The mounting holes are further adapted for mounting a waterfowl decoy and/or an anchoring device to prevent the decoy buoy from floating away while in the water. The entire content of Published US Patent Application Number 2021/0186004 is hereby incorporated by reference.

Another example of a conventional decoy deployment system is disclosed in Published US Patent Application Number 2023/0404063. Published US Patent Application Number 2023/0404063 discloses a waterfowl decoy deployment system having a hub assembly including a central hub and a base coupled to the central hub. The system further includes a motor assembly attached to the base. A plurality of arms is coupled to the central hub and extend radially outward from the central hub. The entire content of Published US Patent Application Number 2023/0404063 is hereby incorporated by reference.

A further example of a conventional decoy deployment system is disclosed in Published US Patent Application Number 2024/0268370. Published US Patent Application Number 2024/0268370 discloses a modular system for a decoy, whereby the modular system includes an adapter configured to couple to the decoy. The adapter includes a connector first portion which removably couples to a connector second portion to form a connection therebetween. The entire content of Published US Patent Application Number 2024/0268370 is hereby incorporated by reference.

One issue with these conventional decoy deployment systems is that the systems are not easily deployable. Moreover, when not deployed, the conventional decoy deployment systems have a large storage footprint.

Thus, it is desirable to provide a decoy deployment system that is easily deployable.

Moreover, it is desirable to provide a decoy deployment system that is compact when undeployed.

Additionally, it is desirable to provide a decoy deployment system that can be easily undeployed.

Also, it is desirable to provide a decoy deployment system that is easily deployable, that can be easily undeployed, and that is compact when undeployed.

Furthermore, it is desirable to provide a floatable decoy deployment system that utilizes two-dimensional silhouette decoys.

Further, it is desirable to provide a floatable decoy deployment system that utilizes two-dimensional silhouette decoys, which is easily deployable, which can be easily undeployed, and which is compact when undeployed.

BRIEF DESCRIPTION OF THE DRAWINGS

The drawings are only for purposes of illustrating various embodiments and are not to be construed as limiting, wherein.

DETAILED DESCRIPTION OF THE DRAWINGS

Figure 1:
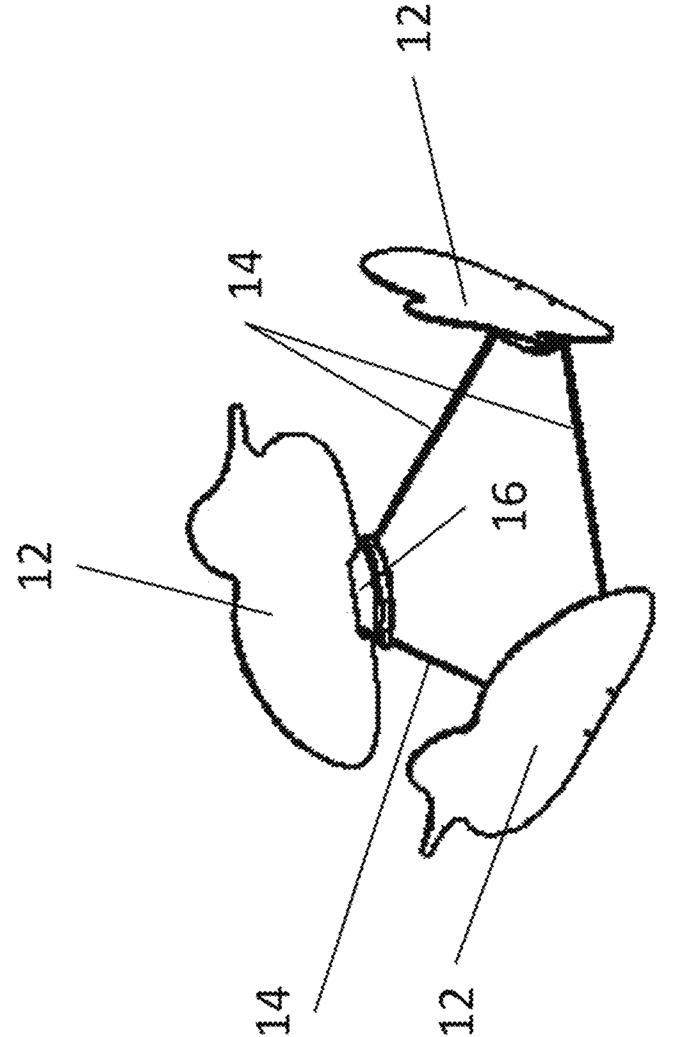
FIG. 1 illustrates an embodiment of a deployed decoy deployment system.

For a general understanding, reference is made to the drawings. In the drawings, like references have been used throughout to designate identical or equivalent elements. It is also noted that the drawings may not have been drawn to scale and that certain regions may have been purposely drawn disproportionately so that the features and concepts may be properly illustrated.

FIG. 1 illustrates an embodiment of a deployed decoy deployment system. As illustrated in FIG. 1, a deployed decoy deployment system 10 includes a plurality of two-dimensional silhouette decoys 12 and a plurality of arms 14. Each two-dimensional silhouette decoy 12 is attached or detachably attached to a decoy/arms interface member 16. Each decoy/arms interface member 16 is attached or detachably attached to two arms 14. The decoy/arms interface members 16 and arms 14 form a triangular base, from which the two-dimensional silhouette decoys 12 can be displayed for attracting the appropriate game.

Figure 2:
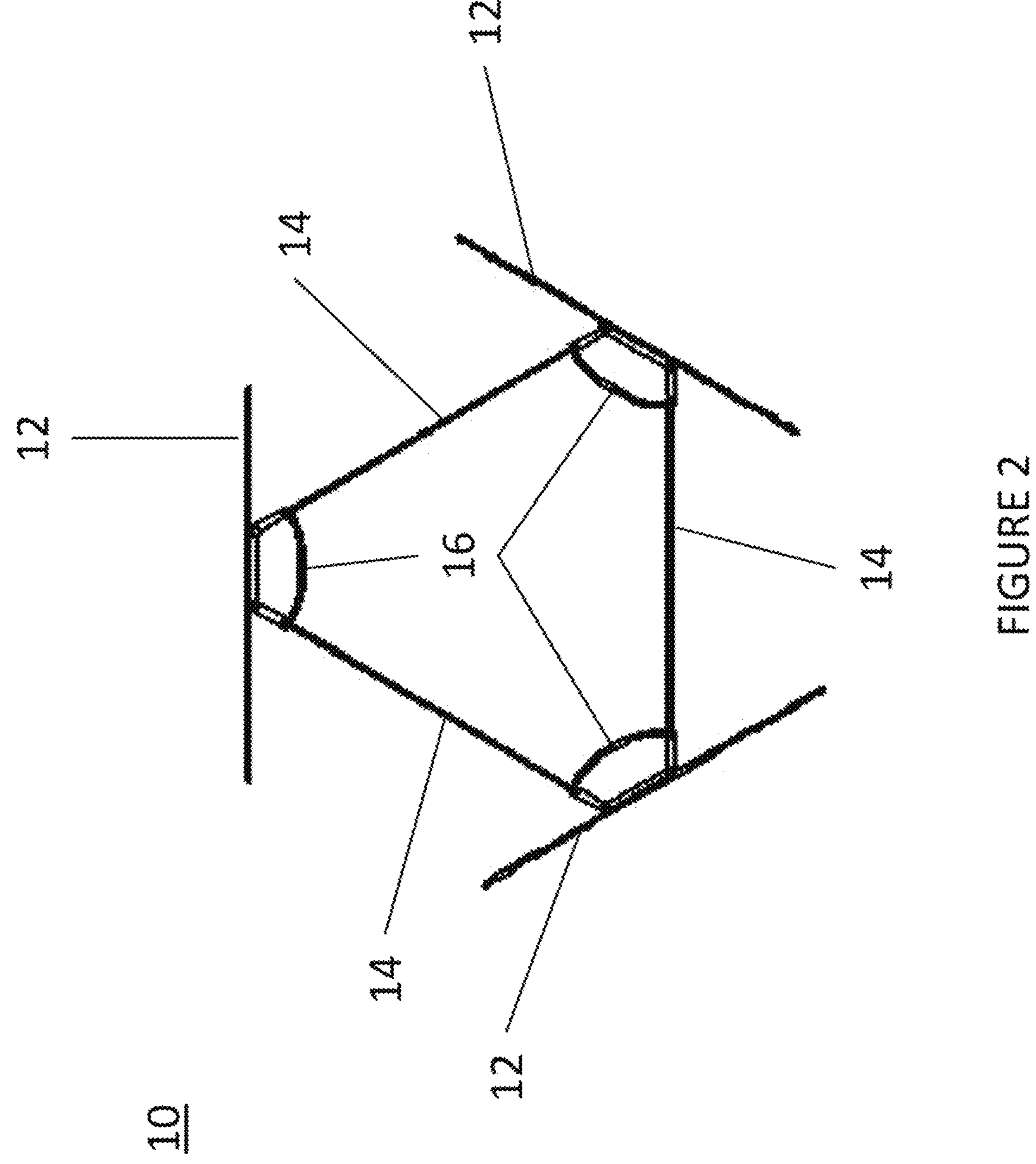
FIG. 2 illustrates a top view of the embodiment of FIG. 1.

FIG. 2 illustrates a top view of the embodiment of FIG. 1. As illustrated in FIG. 2, a deployed decoy deployment system 10 includes a plurality of two-dimensional silhouette decoys 12 and a plurality of arms 14. Each two-dimensional silhouette decoy 12 is attached or detachably attached to a decoy/arms interface member 16. Each decoy/arms interface member 16 is attached or detachably attached to two arms 14. The decoy/arms interface members 16 and arms 14 form a triangular base.

Figure 3:
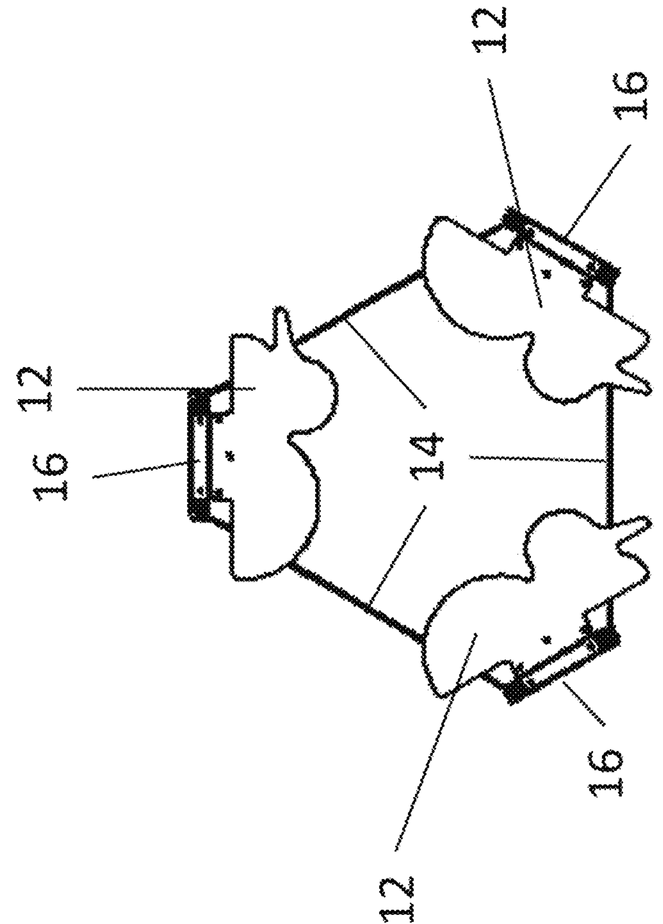
FIG. 3 illustrates a top view of an embodiment of an undeployed deployed decoy deployment system.

FIG. 3 illustrates a top view of an embodiment of an undeployed deployed decoy deployment system. As illustrated in FIG. 3, an undeployed decoy deployment system 10 includes a plurality of two-dimensional silhouette decoys 12 and a plurality of arms 14. Each two-dimensional silhouette decoy 12 is attached or detachably attached to a decoy/arms interface member 16. Each decoy/arms interface member 16 is attached or detachably attached to two arms 14.

The decoy/arms interface members 16 and arms 14 form a triangular base. When in an undeployed state, as illustrated in FIG. 2, the two-dimensional silhouette decoys 12 can be folded over to create a substantially flat and compact decoy deployment system for easy storage and transport.

Figure 4:
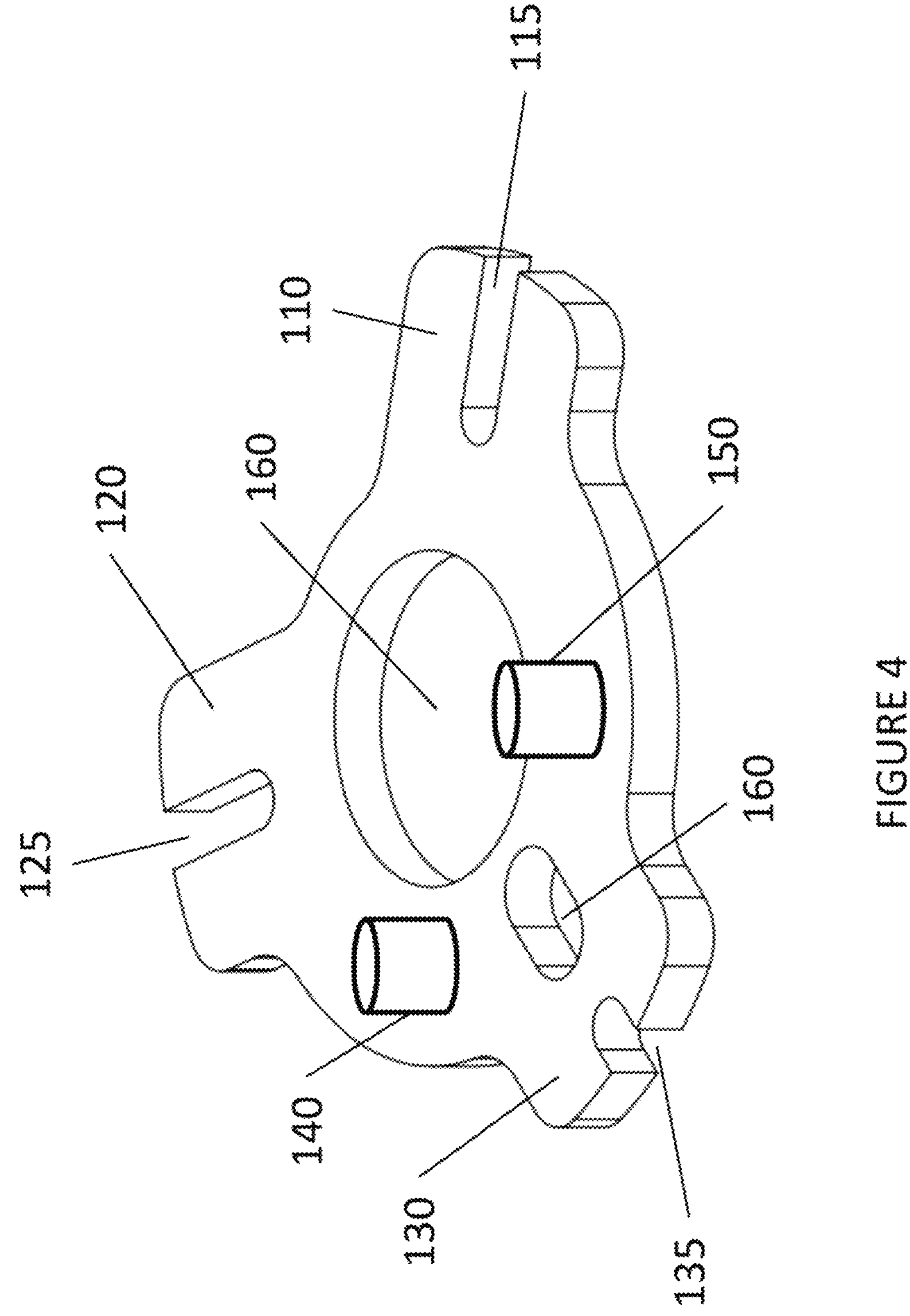
FIG. 4 illustrates a hub for another embodiment of a decoy deployment system.

FIG. 4 illustrates a hub for another embodiment of a decoy deployment system. As illustrated in FIG. 4, hub 100 includes arm interface projections (110, 120, and 130) located such that each pair of arm interface projections has a predetermined angle therebetween. In a preferred embodiment, the predetermined angle is 120°.

The arm interface projection 110 includes an arm notch 115, configured to engage a decoy arm (not shown). The arm interface projection 120 includes an arm notch 125, configured to engage a decoy arm (not shown). The arm interface projection 130 includes an arm notch 135, configured to engage a decoy arm (not shown).

Hub 100 also includes arm attachment projections 140 and 150, configured to rotatably engage decoy arm (not shown), and openings 160, configured to engage a stake, a camera, a motor, or other device to be used with the decoy deployment system.

Figure 5:
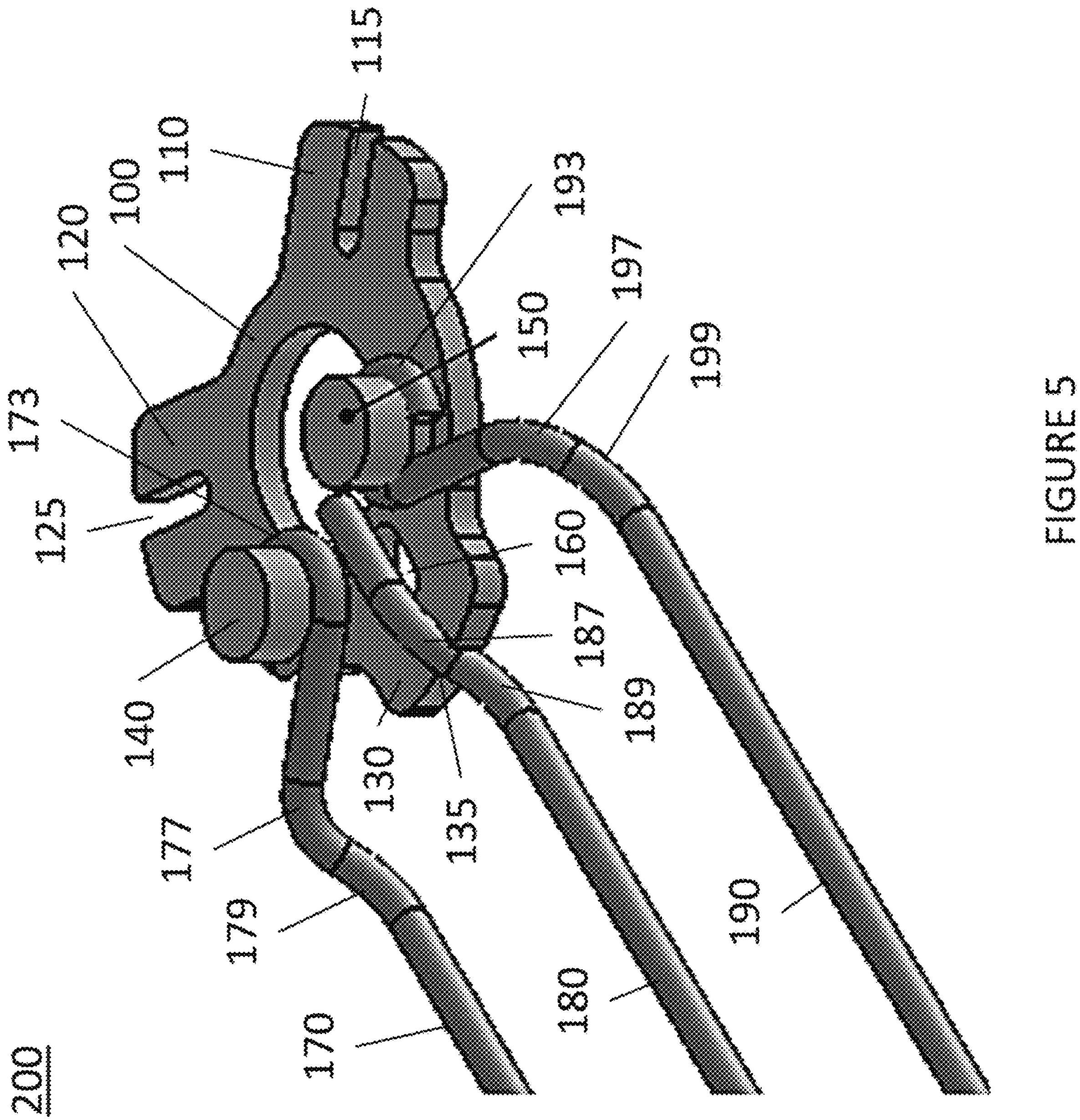
FIG. 5 illustrates a top view of the hub of FIG. 4 with decoy arms in an undeployed state.

FIG. 5 illustrates a top view of the hub of FIG. 4 with decoy arms in an undeployed state. As illustrated in FIG. 5, a decoy deployment system 200 includes a hub 100, which includes arm interface projections (110, 120, and 130) located such that each pair of arm interface projections has a predetermined angle therebetween. In a preferred embodiment, the predetermined angle is 120°.

The arm interface projection 110 includes an arm notch 115, configured to engage decoy arm 190. The arm interface projection 120 includes an arm notch 125, configured to engage decoy arm 170. The arm interface projection 130 includes an arm notch 135, configured to engage decoy arm 180.

Hub 100 also includes arm attachment projections 140 and 150, configured to rotatably engage decoy arms 170 and 190, respectively.

Decoy arm 170 includes rotatable elbow portions 177 and 179. Rotatable elbow portions 177 and 179 are configured to engage arm notch 125 to secure decoy arm 170 in a deployed position. Decoy arm 170 also includes ring portion 173 to rotatably engage arm attachment projection 140. The ring portion 173 is configured to enable the decoy arm 170 to be moved from an undeployed position to a deployed position or from a deployed position to an undeployed position.

Decoy arm 190 includes rotatable elbow portions 197 and 199. Rotatable elbow portions 197 and 199 are configured to engage arm notch 115 to secure decoy arm 190 in a deployed position. Decoy arm 190 also includes ring portion 193 to rotatably engage arm attachment projection 150. The ring portion 193 is configured to enable the decoy arm 190 to be moved from an undeployed position to a deployed position or from a deployed position to an undeployed position.

Decoy arm 180 includes rotatable elbow portions 187 and 189. Rotatable elbow portions 187 and 189 are configured to engage arm notch 135 to secure decoy arm 180 in a deployed position.

When the decoy deployment system 200 is in an undeployed state, decoy arms (170, 180, and 190) are substantially parallel to each other, as illustrated.

Figure 6:
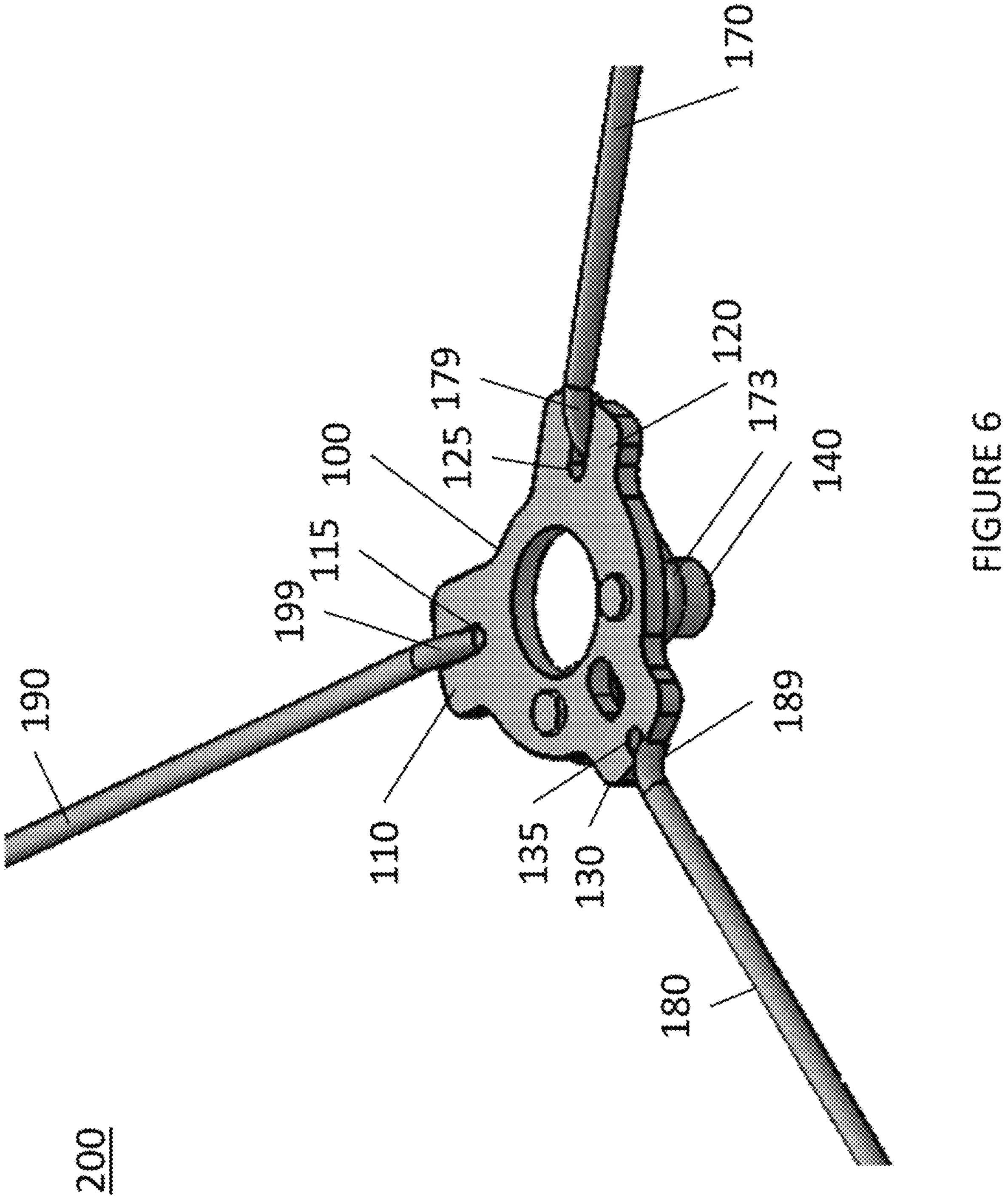
FIG. 6 illustrates a bottom view of the hub of FIG. 4 with decoy arms in a deployed state.

FIG. 6 illustrates a bottom view of the hub of FIG. 4 with decoy arms in a deployed state. As illustrated in FIG. 6, a decoy deployment system 200 includes a hub 100, which includes arm interface projections (110, 120, and 130) located such that each pair of arm interface projections has a predetermined angle therebetween. In a preferred embodiment, the predetermined angle is 120°.

The arm interface projection 110 includes an arm notch 115, configured to engage decoy arm 190. The arm interface projection 120 includes an arm notch 125, configured to engage decoy arm 170. The arm interface projection 130 includes an arm notch 135, configured to engage decoy arm 180.

As illustrated, hub 100 also includes arm attachment projection 140, configured to rotatably engage decoy arm 170.

As illustrated, decoy arm 170 includes rotatable elbow portion 179. Rotatable elbow portion 179 is configured to engage arm notch 125 to secure decoy arm 170 in a deployed position. Decoy arm 170 also includes ring portion 173 to rotatably engage arm attachment projection 140. The ring portion 173 is configured to enable the decoy arm 170 to be moved from an undeployed position to a deployed position or from a deployed position to an undeployed position.

As illustrated, decoy arm 190 includes rotatable elbow portion 199. Rotatable elbow portion 199 is configured to engage arm notch 115 to secure decoy arm 190 in a deployed position.

As illustrated, decoy arm 180 includes rotatable elbow portion 189. Rotatable elbow portion 189 is configured to engage arm notch 135 to secure decoy arm 180 in a deployed position.

When the decoy deployment system 200 is in a deployed state, decoy arms (170, 180, and 190) are at a predetermined angle to each other. In a preferred embodiment, the predetermined angle is 120°.

Figure 7:
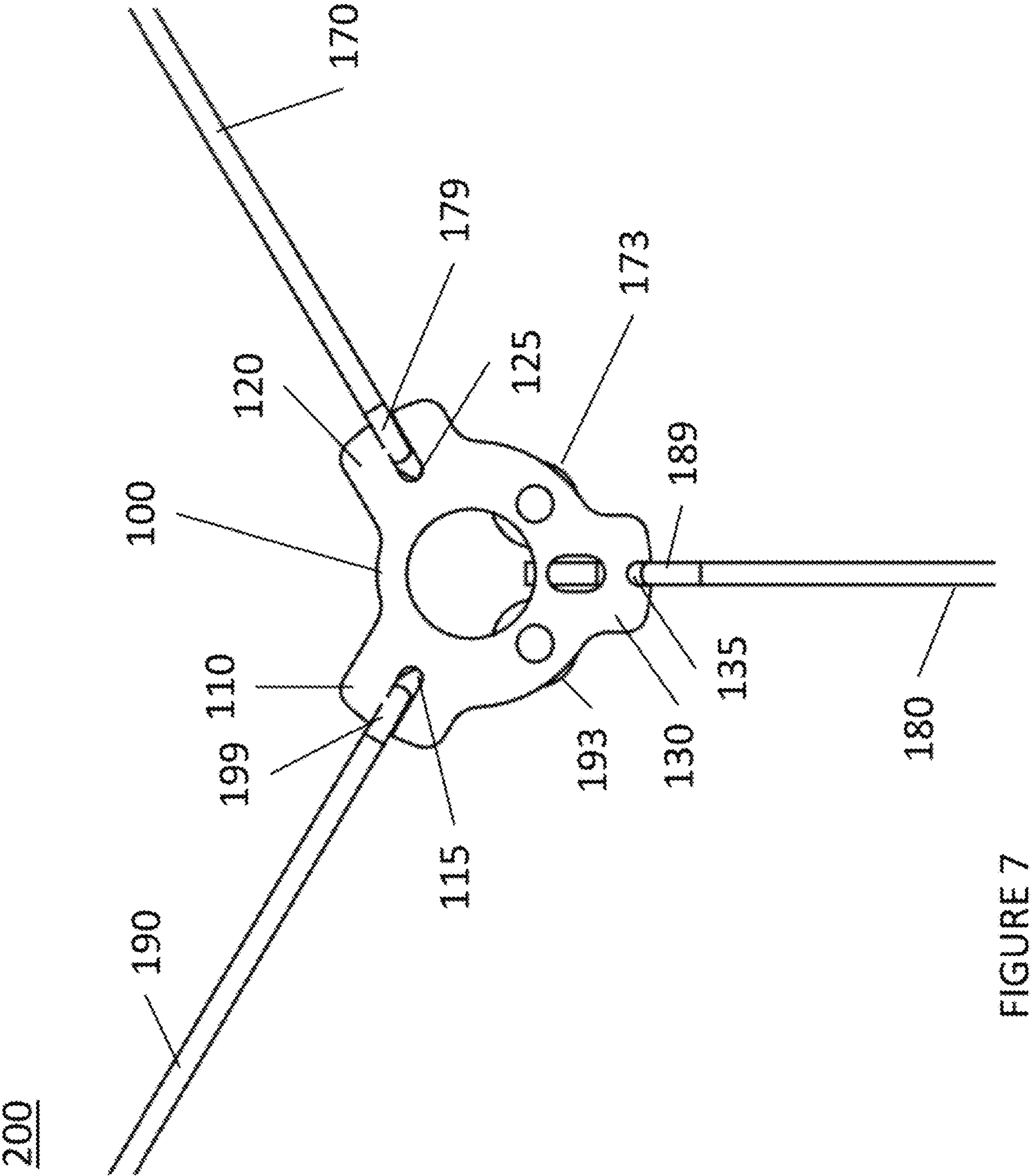
FIG. 7 illustrates another bottom view of the hub of FIG. 4 with decoy arms in a deployed state.

FIG. 7 illustrates another bottom view of the hub of FIG. 4 with decoy arms in a deployed state. As illustrated in FIG. 7, a decoy deployment system 200 includes a hub 100, which includes arm interface projections (110, 120, and 130) located such that each pair of arm interface projections has a predetermined angle therebetween. In a preferred embodiment, the predetermined angle is 120°.

The arm interface projection 110 includes an arm notch 115, configured to engage decoy arm 190. The arm interface projection 120 includes an arm notch 125, configured to engage decoy arm 170. The arm interface projection 130 includes an arm notch 135, configured to engage decoy arm 180.

As illustrated, decoy arm 170 includes rotatable elbow portion 179. Rotatable elbow portion 179 is configured to engage arm notch 125 to secure decoy arm 170 in a deployed position. Decoy arm 170 also includes ring portion 173 to rotatably engage an arm attachment projection (not shown). The ring portion 173 is configured to enable the decoy arm 170 to be moved from an undeployed position to a deployed position or from a deployed position to an undeployed position.

As illustrated, decoy arm 190 includes rotatable elbow portion 199. Rotatable elbow portion 199 is configured to engage arm notch 115 to secure decoy arm 190 in a deployed position. Decoy arm 190 also includes ring portion 193 to rotatably engage an arm attachment projection (not shown). The ring portion 193 is configured to enable the decoy arm 190 to be moved from an undeployed position to a deployed position or from a deployed position to an undeployed position.

As illustrated, decoy arm 180 includes rotatable elbow portion 189. Rotatable elbow portion 189 is configured to engage arm notch 135 to secure decoy arm 180 in a deployed position. When the decoy deployment system 200 is in a deployed state, decoy arms (170, 180, and 190) are at a predetermined angle to each other. In a preferred embodiment, the predetermined angle is 120°.

Figure 8:
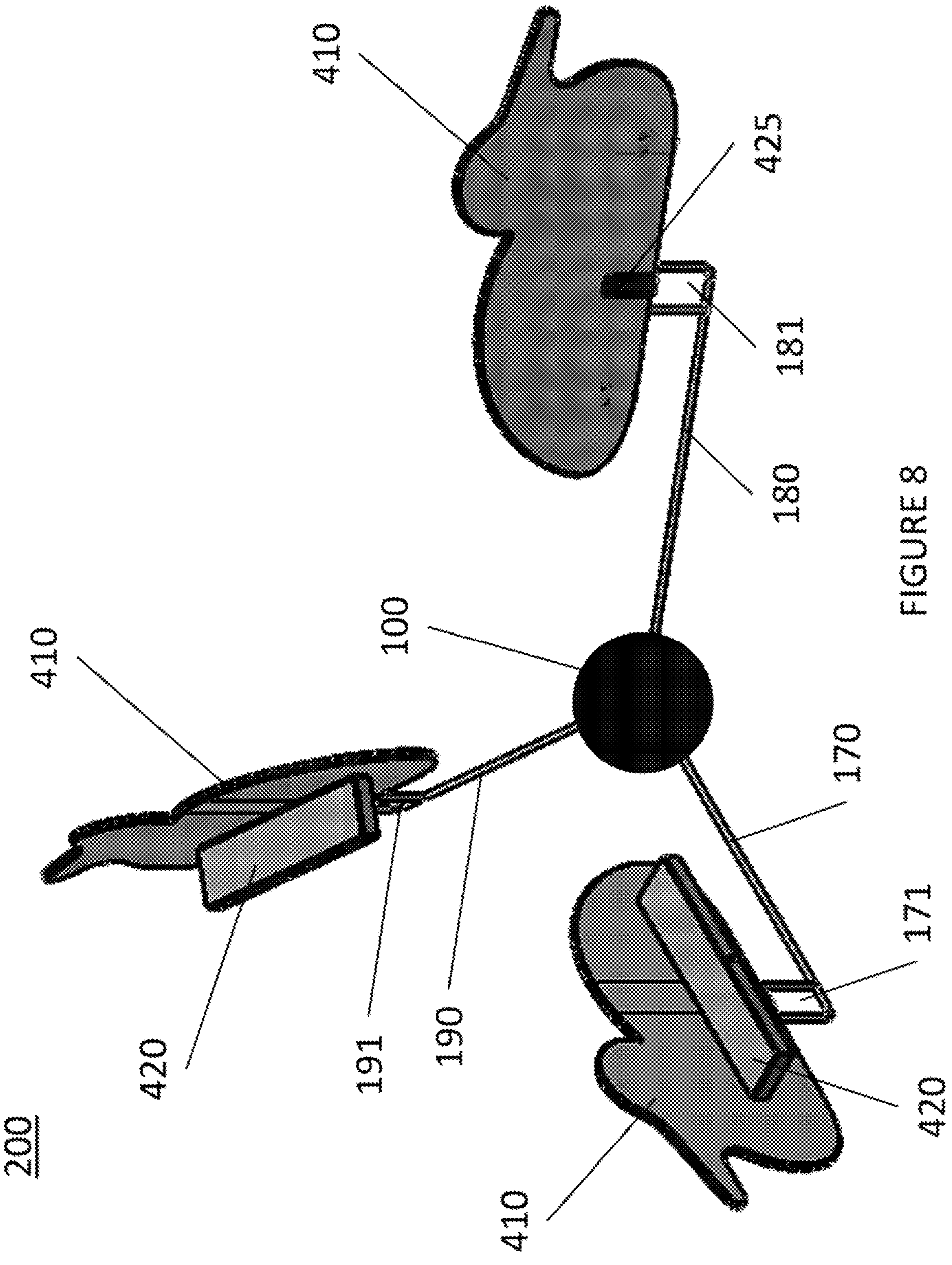
FIG. 8 illustrates a perspective view of an embodiment of a deployed decoy deployment system using the hub of FIG. 4.

FIG. 8 illustrates a perspective view of an embodiment of a deployed decoy deployment system using the hub of FIG. 4. As illustrated in FIG. 8, a decoy deployment system 200 includes a hub 100 and decoy arms (170, 180, and 190).

As illustrated, decoy arm 170 includes a decoy attachment interface 171, configured to attach a two-dimensional silhouette decoy 410. Decoy arm 190 includes a decoy attachment interface 191, configured to attach a two-dimensional silhouette decoy 410. Decoy arm 180 includes a decoy attachment interface 181, configured to attach a two-dimensional silhouette decoy 410.

As illustrated, an optional float 420 may be connected to a two-dimensional silhouette decoy 410, using a float attachment interface 425 to enable the decoy deployment system 200 to be used on water.

Figure 9:
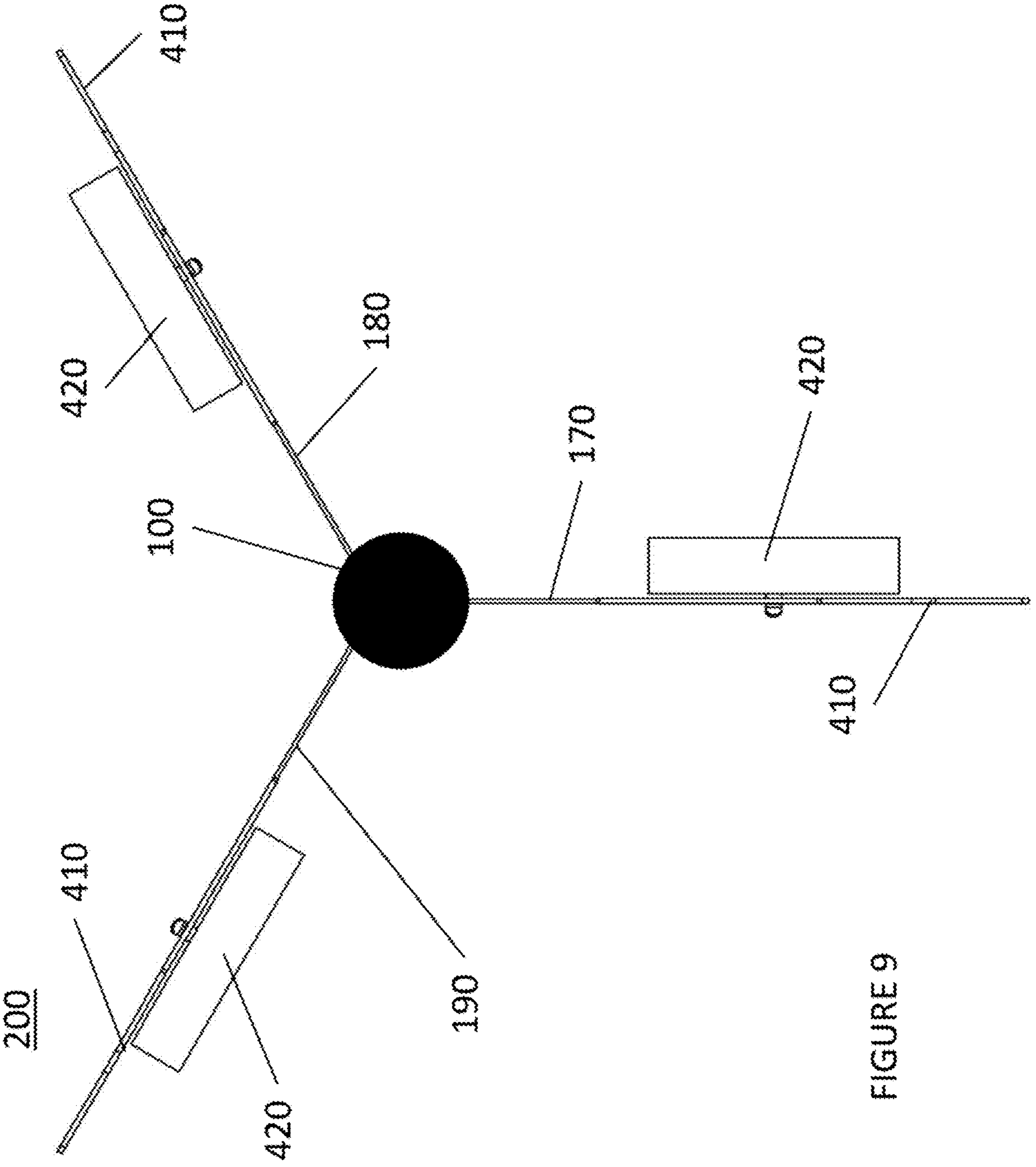
FIG. 9 illustrates a top view of an embodiment of a deployed decoy deployment system using the hub of FIG. 4.

FIG. 9 illustrates a top view of an embodiment of a deployed decoy deployment system using the hub of FIG. 4. As illustrated in FIG. 9, a decoy deployment system 200 includes a hub 100 and decoy arms (170, 180, and 190).

As illustrated, an optional float 420 may be connected to a two-dimensional silhouette decoy 410, using a float attachment interface 425 to enable the decoy deployment system 200 to be used on water.

Figure 10:
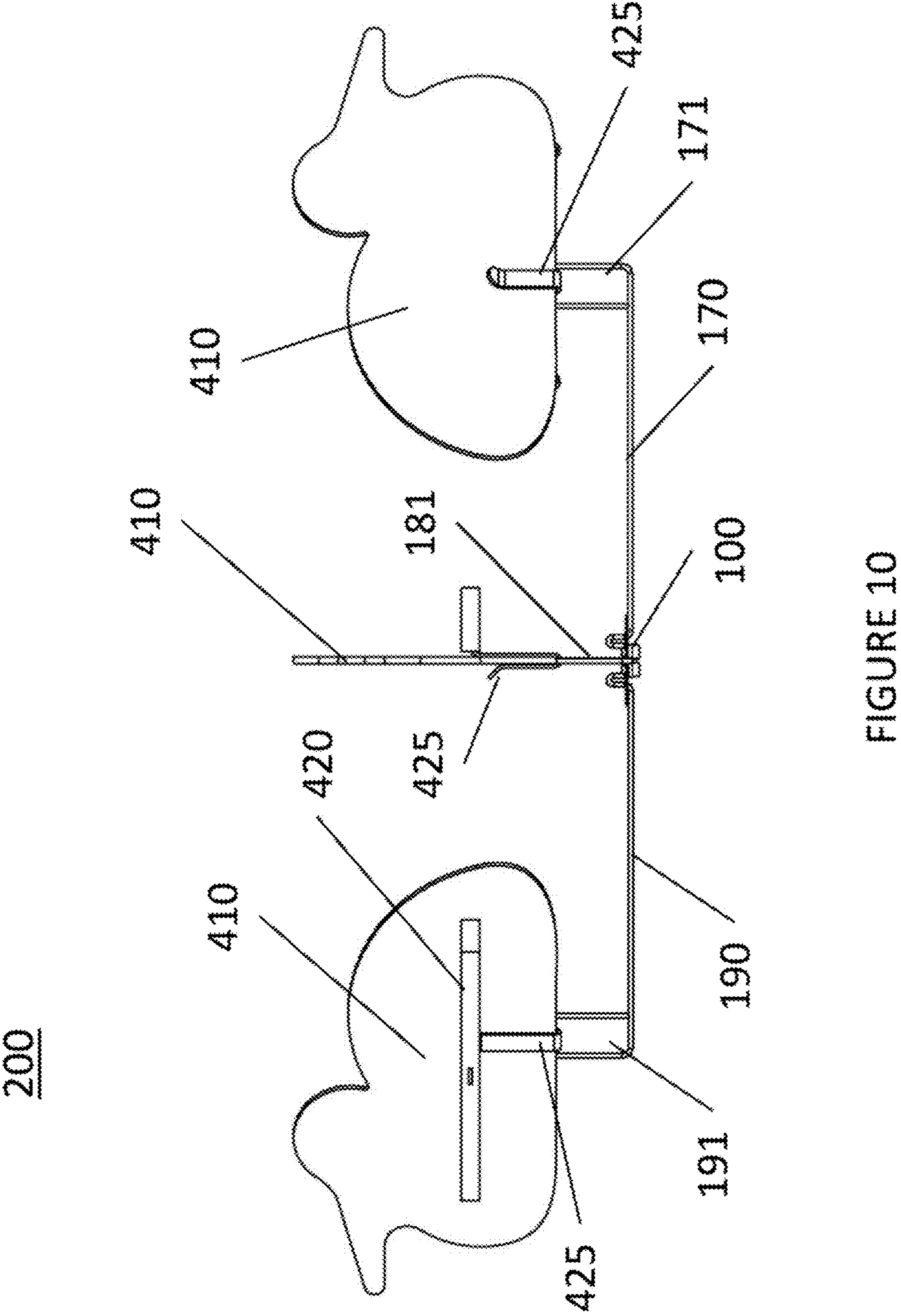
FIG. 10 illustrates a side view of an embodiment of a deployed decoy deployment system using the hub of FIG. 4.

FIG. 10 illustrates a side view of an embodiment of a deployed decoy deployment system using the hub of FIG. 4. As illustrated in FIG. 10, a decoy deployment system 200 includes a hub 100 and decoy arms 170 and 190.

As illustrated, decoy arm 170 includes a decoy attachment interface 171, configured to attach a two-dimensional silhouette decoy 410. Decoy arm 190 includes a decoy attachment interface 191, configured to attach a two-dimensional silhouette decoy 410. A decoy arm (not shown) includes a decoy attachment interface 181, configured to attach a two-dimensional silhouette decoy 410.

As illustrated, an optional float 420 may be connected to a two-dimensional silhouette decoy 410, using a float attachment interface 425 to enable the decoy deployment system 200 to be used on water.

Figure 11:
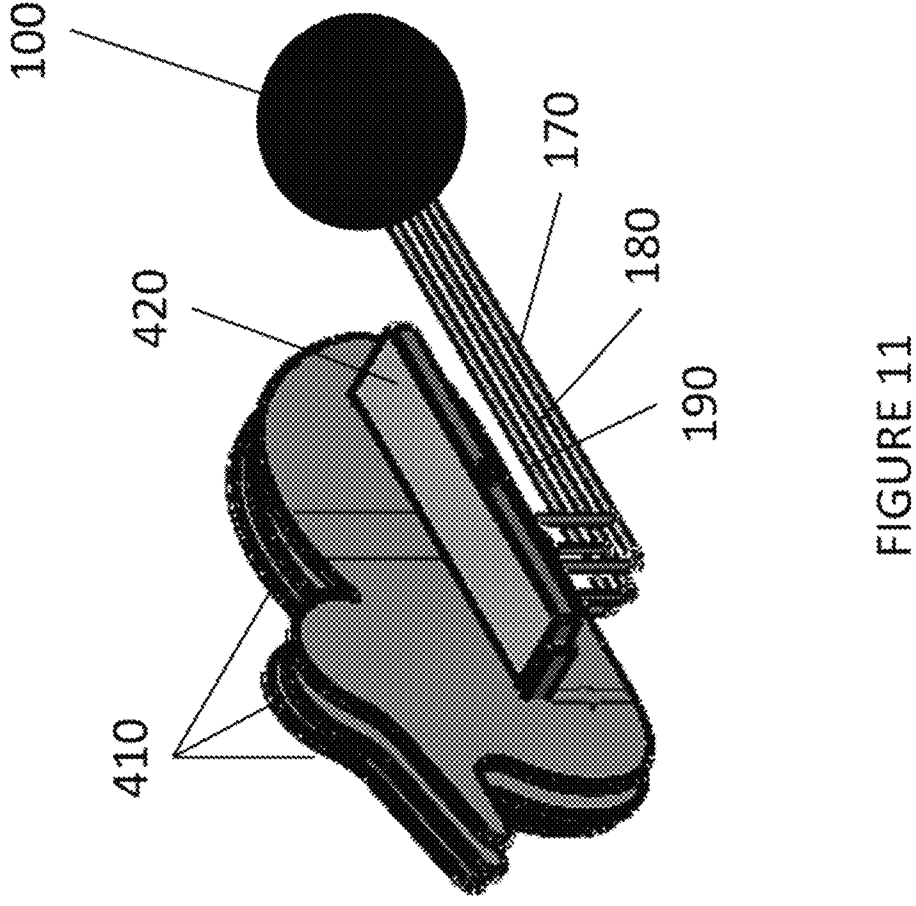
FIG. 11 illustrates a perspective view of an embodiment of an undeployed decoy deployment system using the hub of FIG. 4.

FIG. 11 illustrates a perspective view of an embodiment of an undeployed decoy deployment system using the hub of FIG. 4. As illustrated in FIG. 11, a decoy deployment system 200 includes a hub 100 and decoy arms (170, 180, and 190).

As illustrated, an optional float 420 may be connected to a two-dimensional silhouette decoy 410. When the decoy deployment system 200 is in an undeployed state, decoy arms (170, 180, and 190) and two-dimensional silhouette decoys 410 are substantially parallel to each other.

Figure 12:
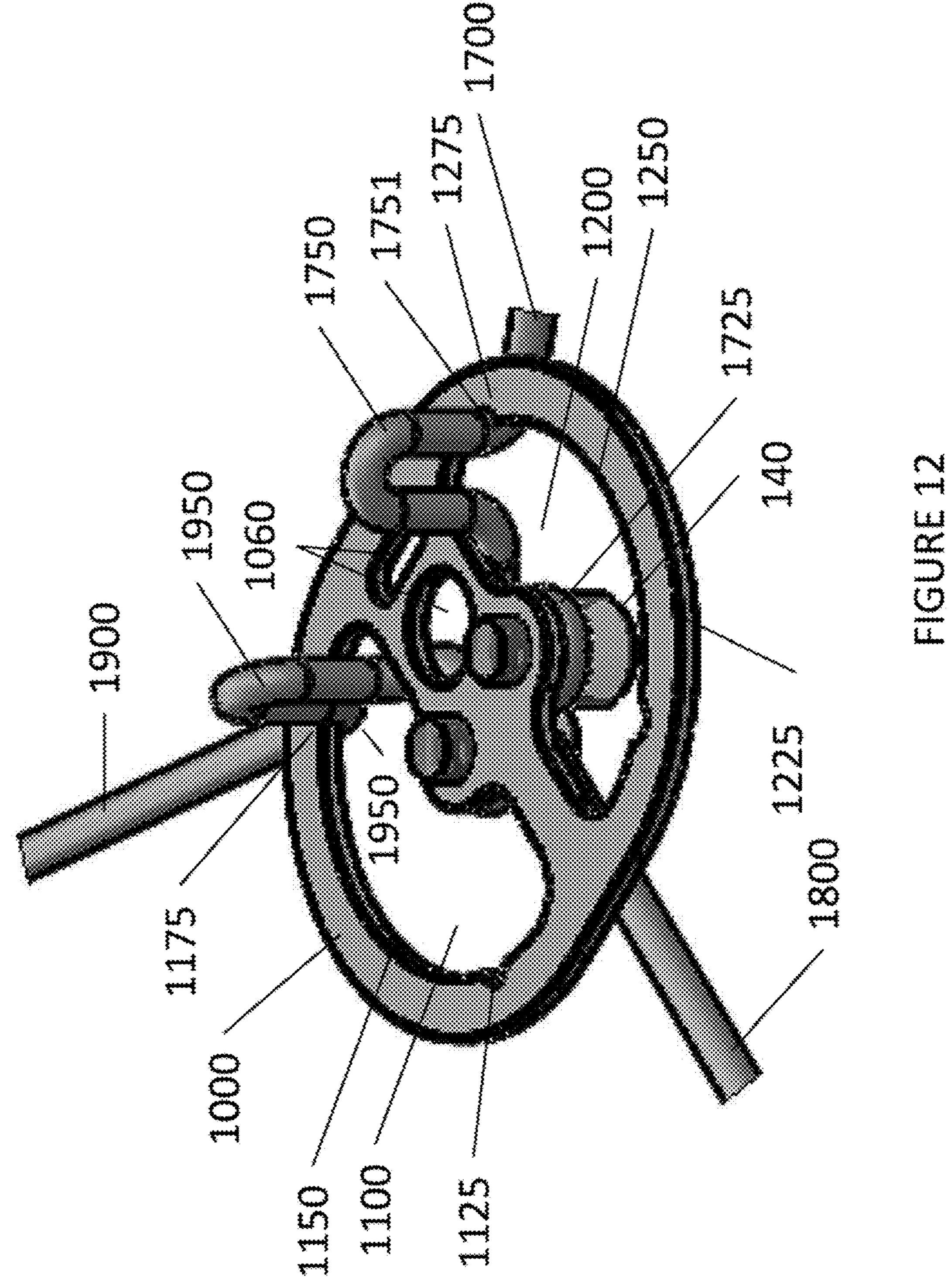
FIG. 12 illustrates a top view of another embodiment of a hub for another embodiment of a deployed decoy deployment system.

FIG. 12 illustrates a top view of another embodiment of a hub for another embodiment of a deployed decoy deployment system. As illustrated in FIG. 12, a hub 1000 includes an arm channel notch 1175, configured to engage decoy arm 1900, an arm channel notch 1125, configured to engage decoy arm 1900, an arm channel notch 1275, configured to engage decoy arm 1700, and an arm channel notch 1225, configured to engage decoy arm 1700. The hub 1000 also includes an arm attachment projection 140, configured to rotatably engage decoy arm 1700, and channels (openings) 1100 and 1200.

Decoy arm 1700 includes a U-shaped portion 1750, configured to engage channel 1200, arm channel notch 1275, and arm channel notch 1225. Decoy arm 1700 also includes ring portion 1725 to rotatably engage arm attachment projection 140. The ring portion 1725 is configured to enable the decoy arm 1700 to be moved from an undeployed position, wherein the U-shaped portion 1750 engages arm channel notch 1225, to a deployed position, wherein the U-shaped portion 1750 engages arm channel notch 1275, or from a deployed position, wherein the U-shaped portion 1750 engages arm channel notch 1275, to an undeployed position, wherein the U-shaped portion 1750 engages arm channel notch 1225.

The U-shaped portion 1750 is configured to provide tension such that an elbow portion 1751 of the U-shaped portion 1750 is biased against an outer wall 1250 of the channel 1200. The bias state of the U-shaped portion 1750 enables the elbow portion 1751 of the U-shaped portion 1750 to actively engage the arm channel notch 1275, or the arm channel notch 1225 so that the decoy arm 1700 is held in the undeployed position (arm channel notch 1225) or the deployed position (arm channel notch 1275).

Decoy arm 1900 includes a U-shaped portion 1950, configured to engage channel 1100, arm channel notch 1175, and arm channel notch 1125. Decoy arm 1900 also includes ring portion (not shown) to rotatably engage an arm attachment projection (not shown). The ring portion (not shown) is configured to enable the decoy arm 1900 to be moved from an undeployed position, wherein the U-shaped portion 1950 engages arm channel notch 1125, to a deployed position, wherein the U-shaped portion 1950 engages arm channel notch 1175, or from a deployed position, wherein the U-shaped portion 1950 engages arm channel notch 1175, to an undeployed position, wherein the U-shaped portion 1950 engages arm channel notch 1125.

The U-shaped portion 1950 is configured to provide tension such that an elbow portion 1951 of the U-shaped portion 1950 is biased against an outer wall 1150 of the channel 1100. The bias state of the U-shaped portion 1950 enables the elbow portion 1951 of the U-shaped portion 1950 to actively engage the arm channel notch 1175, or the arm channel notch 1125 so that the decoy arm 1900 is held in the undeployed position (arm channel notch 1125) or the deployed position (arm channel notch 1175).

The hub 1000 also includes openings 1060, configured to engage a stake, a camera, a motor, or other device to be used with the decoy deployment system.

When the decoy deployment system is in a deployed state, decoy arms (1700, 1800, and 1900) are at predetermined angles to each other. In a preferred embodiment, the predetermined angle is 120°.

Figure 13:
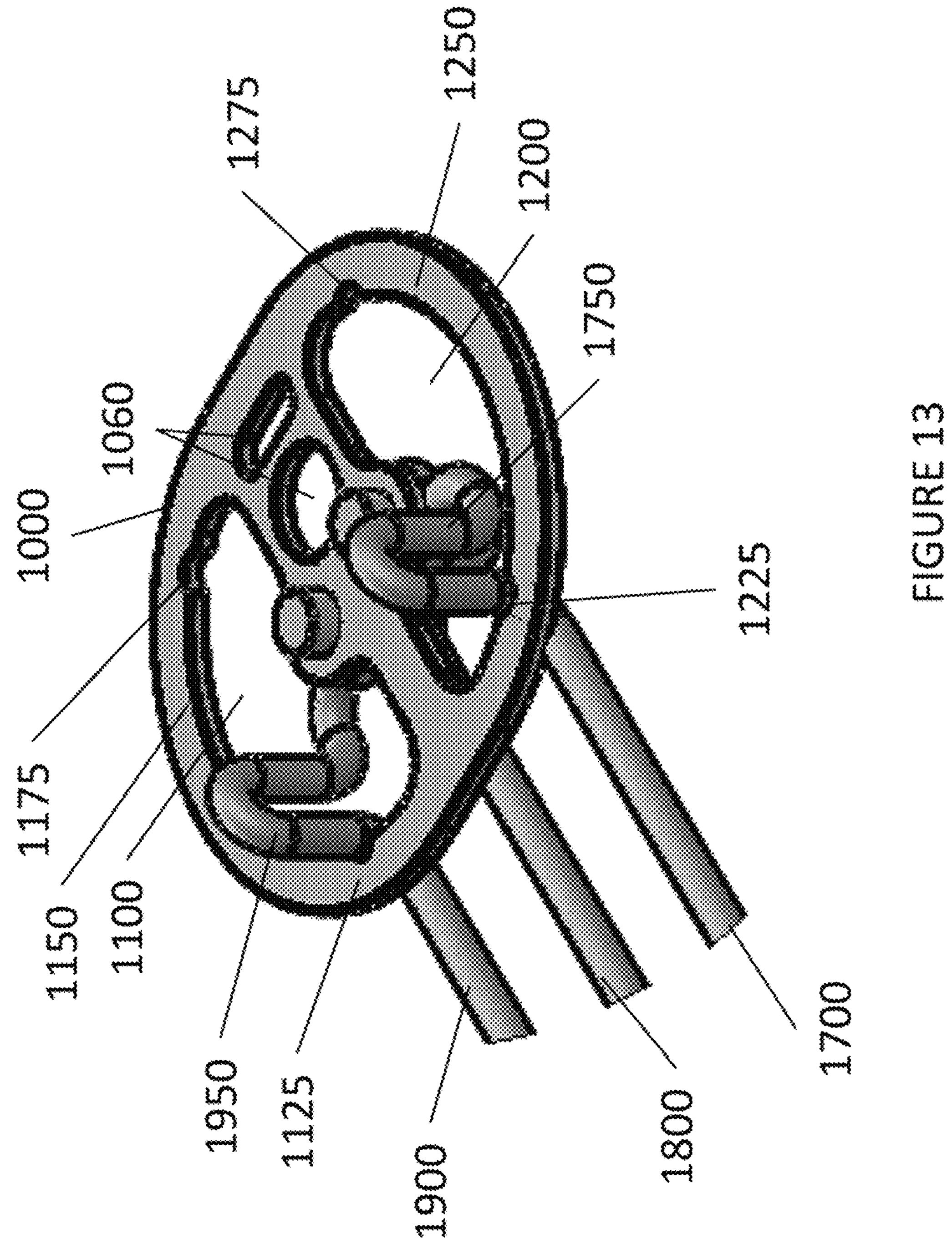
FIG. 13 illustrates a top view of the embodiment of FIG. 12 in an undeployed state.

FIG. 13 illustrates a top view of the embodiment of FIG. 12 in an undeployed state. As illustrated in FIG. 13, a hub 1000 includes an arm channel notch 1175, configured to engage decoy arm 1900, an arm channel notch 1125, configured to engage decoy arm 1900, an arm channel notch 1275, configured to engage decoy arm 1700, and an arm channel notch 1225, configured to engage decoy arm 1700. Hub 1000 also includes channels (openings) 1100 and 1200.

Decoy arm 1700 includes a U-shaped portion 1750, configured to engage channel 1200, arm channel notch 1275, and arm channel notch 1225. The decoy arm 1700 is configured to be moved from an undeployed position, wherein the U-shaped portion 1750 engages arm channel notch 1225, to a deployed position, wherein the U-shaped portion 1750 engages arm channel notch 1275, or from a deployed position, wherein the U-shaped portion 1750 engages arm channel notch 1275, to an undeployed position, wherein the U-shaped portion 1750 engages arm channel notch 1225.

The U-shaped portion 1750 is configured to provide tension such that an elbow portion (not shown) of the U-shaped portion 1750 is biased against an outer wall 1250 of the channel 1200. The bias state of the U-shaped portion 1750 enables the elbow portion (not shown) of the U-shaped portion 1750 to actively engage the arm channel notch 1275, or the arm channel notch 1225 so that the decoy arm 1700 is held in the undeployed position (arm channel notch 1225) or the deployed position (arm channel notch 1275).

Decoy arm 1900 includes a U-shaped portion 1950, configured to engage channel 1100, arm channel notch 1175, and arm channel notch 1125. The decoy arm 1900 is configured to be moved from an undeployed position, wherein the U-shaped portion 1950 engages arm channel notch 1125, to a deployed position, wherein the U-shaped portion 1950 engages arm channel notch 1175, or from a deployed position, wherein the U-shaped portion 1950 engages arm channel notch 1175, to an undeployed position, wherein the U-shaped portion 1950 engages arm channel notch 1125.

The U-shaped portion 1950 is configured to provide tension such that an elbow portion (not shown) of the U-shaped portion 1950 is biased against an outer wall 1150 of the channel 1100. The bias state of the U-shaped portion 1950 enables the elbow portion (not shown) of the U-shaped portion 1950 to actively engage the arm channel notch 1175, or the arm channel notch 1125 so that the decoy arm 1900 is held in the undeployed position (arm channel notch 1125) or the deployed position (arm channel notch 1175).

The hub 1000 also includes openings 1060, configured to engage a stake, a camera, a motor, or other device to be used with the decoy deployment system.

When the decoy deployment system is in an undeployed state, decoy arms (1700, 1800, and 1900) are substantially parallel to each other.

Figure 14:
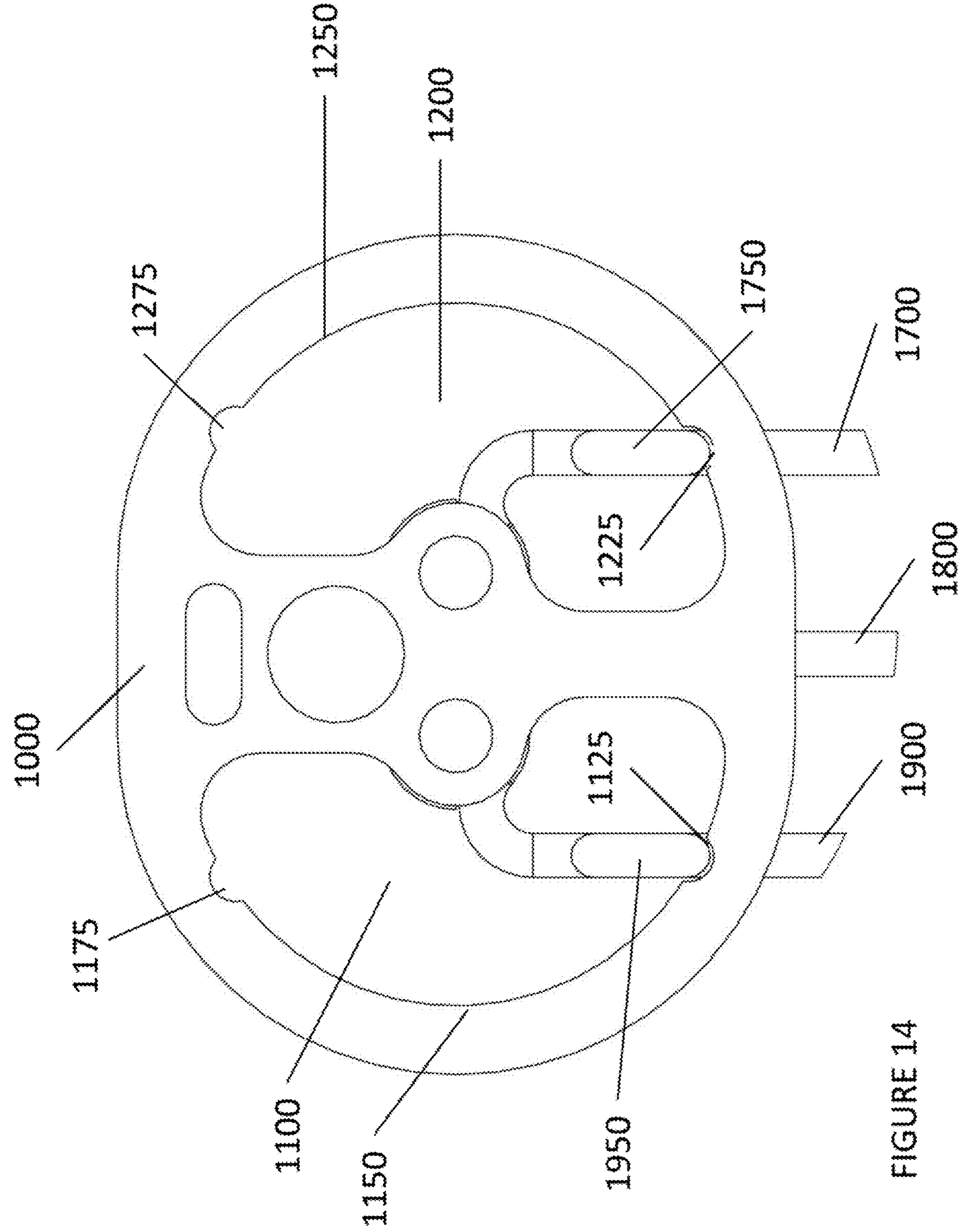
FIG. 14 illustrates another top view of the embodiment of FIG. 12 in an undeployed state.

FIG. 14 illustrates another top view of the embodiment of FIG. 12 in an undeployed state. As illustrated in FIG. 14, a hub 1000 includes an arm channel notch 1175, configured to engage decoy arm 1900, an arm channel notch 1125, configured to engage decoy arm 1900, an arm channel notch 1275, configured to engage decoy arm 1700, and an arm channel notch 1225, configured to engage decoy arm 1700. Hub 1000 also includes channels (openings) 1100 and 1200.

Decoy arm 1700 includes a U-shaped portion 1750, configured to engage channel 1200, arm channel notch 1275, and arm channel notch 1225. The decoy arm 1700 is configured to be moved from an undeployed position, wherein the U-shaped portion 1750 engages arm channel notch 1225, to a deployed position, wherein the U-shaped portion 1750 engages arm channel notch 1275, or from a deployed position, wherein the U-shaped portion 1750 engages arm channel notch 1275, to an undeployed position, wherein the U-shaped portion 1750 engages arm channel notch 1225.

The U-shaped portion 1750 is configured to provide tension such that an elbow portion (not shown) of the U-shaped portion 1750 is biased against an outer wall 1250 of the channel 1200. The bias state of the U-shaped portion 1750 enables the elbow portion (not shown) of the U-shaped portion 1750 to actively engage the arm channel notch 1275, or the arm channel notch 1225 so that the decoy arm 1700 is held in the undeployed position (arm channel notch 1225) or the deployed position (arm channel notch 1275).

Decoy arm 1900 includes a U-shaped portion 1950, configured to engage channel 1100, arm channel notch 1175, and arm channel notch 1125. The decoy arm 1900 is configured to be moved from an undeployed position, wherein the U-shaped portion 1950 engages arm channel notch 1125, to a deployed position, wherein the U-shaped portion 1950 engages arm channel notch 1175, or from a deployed position, wherein the U-shaped portion 1950 engages arm channel notch 1175, to an undeployed position, wherein the U-shaped portion 1950 engages arm channel notch 1125.

The U-shaped portion 1950 is configured to provide tension such that an elbow portion (not shown) of the U-shaped portion 1950 is biased against an outer wall 1150 of the channel 1100. The bias state of the U-shaped portion 1950 enables the elbow portion (not shown) of the U-shaped portion 1950 to actively engage the arm channel notch 1175, or the arm channel notch 1125 so that the decoy arm 1900 is held in the undeployed position (arm channel notch 1125) or the deployed position (arm channel notch 1175).

The above described embodiments, the two-dimensional silhouette decoys can be presented in three different positions, each in a horizontal orientation. The two-dimensional silhouette decoy is two-sided and can be held in place, to the deployment system, on either side. The positions of each two-dimensional silhouette decoy may or may not be parallel to each other.

Multiple decoy deployment systems can be used together, with each system being tethered to the other system. The two-dimensional silhouette decoys can be attached to the decoy arms using a hinge so that the two-dimensional silhouette decoys can be folded over when not being deployed.

A decoy deployment system includes a hub; a first decoy arm operatively connected to the hub; a second decoy arm operatively connected to the hub; and a third decoy arm operatively connected to the hub; the first and second decoy arms being configured to move from an undeployed position to a deployed position; the hub including a first decoy arm notch and a second decoy arm notch; the first decoy arm notch being configured to engage the first decoy arm and to secure the first decoy arm in a deployed position; the second decoy arm notch being configured to engage the second decoy arm and to secure the second decoy arm in a deployed position.

The system may further include a first arm attachment projection operatively connected to the first decoy arm; and a second arm attachment projection operatively connected to the second decoy arm; the first arm attachment projection being configured to enable the first decoy arm to rotate between an undeployed position to a deployed position; the second arm attachment projection being configured to enable the second decoy arm to rotate between an undeployed position to a deployed position.

The first decoy arm may be detachably connected to the first arm attachment projection. The second decoy arm may be detachably connected to the second arm attachment projection.

Each decoy arm may have a two-dimensional silhouette decoy attached thereto. Each two-dimensional silhouette decoy may be detachably attached to the decoy arms. Each two-dimensional silhouette decoy may have a float attached thereto. Each float may be detachably attached to the two-dimensional silhouette decoy.

The first decoy arm may include a first rotatable elbow portion configured to engage the first decoy arm notch. The second decoy arm may include a second rotatable elbow portion configured to engage the second decoy arm notch.

The hub may include a first channel and a second channel. The first channel may include the first decoy arm notch. The second channel may include the second decoy arm notch. The first decoy arm may include a U-shaped portion configured to engage the first channel. The U-shaped portion of the first decoy arm may include an elbow portion. The second decoy arm may include a U-shaped portion configured to engage the second channel. The U-shaped portion of the second decoy arm may include an elbow portion. The elbow portion of the U-shaped portion of the first decoy arm may be configured to engage the first decoy arm notch and to secure the first decoy arm in a deployed position. The elbow portion of the U-shaped portion of the second decoy arm may be configured to engage the second decoy arm notch and to secure the second decoy arm in a deployed position.

The U-shaped portion of the first decoy arm may be configured to bias the elbow portion of the U-shaped portion of the first decoy arm against an outer wall of the first channel. The U-shaped portion of the second decoy arm may be configured to bias the elbow portion of the U-shaped portion of the second decoy arm against an outer wall of the second channel.

The U-shaped portion of the first decoy arm may be configured to bias the elbow portion of the U-shaped portion of the first decoy arm to actively engage the first decoy arm notch and to securely hold the first decoy arm in a deployed position. The U-shaped portion of the second decoy arm may be configured to bias the elbow portion of the U-shaped portion of the second decoy arm to actively engage the second decoy arm notch and to securely hold the second decoy arm in a deployed position.

The first channel may include a third decoy arm notch; the second channel may include a fourth decoy arm notch; the elbow portion of the U-shaped portion of the first decoy arm may be configured to engage the third decoy arm notch and to secure the first decoy arm in an undeployed position; and the elbow portion of the U-shaped portion of the second decoy arm may be configured to engage the fourth decoy arm notch and to secure the second decoy arm in an undeployed position.

The U-shaped portion of the first decoy arm may be configured to bias the elbow portion of the U-shaped portion of the first decoy arm to actively engage the third decoy arm notch and to securely hold the first decoy arm in an undeployed position, and the U-shaped portion of the second decoy arm may be configured to bias the elbow portion of the U-shaped portion of the second decoy arm to actively engage the fourth decoy arm notch and to securely hold the second decoy arm in an undeployed position.

It will be appreciated that variations of the above-disclosed embodiments and other features and functions, or alternatives thereof, may be desirably combined into many other different systems or applications. Also, various presently unforeseen or unanticipated alternatives, modifications, variations or improvements therein may be subsequently made by those skilled in the art which are also intended to be encompassed by the description above and the following claims.

What is claimed is:

1. A decoy deployment system, comprising:

a hub;

a first decoy arm being detachably connected to said hub;

a second decoy arm being detachably connected to said hub; and a third decoy arm being detachably connected to said hub;

said first and second decoy arms being configured to move from an undeployed position to a deployed position;

said hub including a first decoy arm notch, a second decoy arm notch, and a third decoy arm notch;

said first decoy arm notch being configured to engage said first decoy arm and to secure said first decoy arm in a deployed position;

said second decoy arm notch being configured to engage said second decoy arm and to secure said second decoy arm in a deployed position;

said third decoy arm notch being configured to engage said third decoy arm and to secure said third decoy arm in a deployed position;

said hub including a first channel and a second channel;

said first channel including said first decoy arm notch;

said second channel including said second decoy arm notch;

said first decoy arm having a U-shaped portion configured to engage said first channel;

said U-shaped portion of said first decoy arm having an elbow portion;

said second decoy arm having a U-shaped portion configured to engage said second channel;

said U-shaped portion of said second decoy arm having an elbow portion;

said elbow portion of said U-shaped portion of said first decoy arm being configured to engage said first decoy arm notch and to secure said first decoy arm in a deployed position;

said elbow portion of said U-shaped portion of said second decoy arm being configured to engage said second decoy arm notch and to secure said second decoy arm in a deployed position.

2. The system as claimed in claim 1, further comprising:

a first arm attachment projection operatively connected to said first decoy arm; and a second arm attachment projection operatively connected to said second decoy arm;

said first arm attachment projection being configured to enable said first decoy arm to rotate between an undeployed position to a deployed position;

said second arm attachment projection being configured to enable said second decoy arm to rotate between an undeployed position to a deployed position.

3. The system as claimed in claim 2, wherein said first decoy arm is detachably connected to said first arm attachment projection;

said second decoy arm being detachably connected to said second arm attachment projection.

4. The system as claimed in claim 1, wherein each decoy arm has a two-dimensional silhouette decoy attached thereto.

5. The system as claimed in claim 4, wherein each two-dimensional silhouette decoy is detachably attached to said decoy arms.

6. The system as claimed in claim 4, wherein each two-dimensional silhouette decoy has a float attached thereto.

7. The system as claimed in claim 6, wherein each float is detachably attached to said two-dimensional silhouette decoy.

8. The system as claimed in claim 1, wherein said first decoy arm includes a first rotatable elbow portion configured to engage said first decoy arm notch;

said second decoy arm including a second rotatable elbow portion configured to engage said second decoy arm notch.

9. The system as claimed in claim 1, wherein said U-shaped portion of said first decoy arm is configured to bias said elbow portion of said U-shaped portion of said first decoy arm against an outer wall of said first channel;

said U-shaped portion of said second decoy arm is configured to bias said elbow portion of said U-shaped portion of said second decoy arm against an outer wall of said second channel.

10. The system as claimed in claim 9, wherein said U-shaped portion of said first decoy arm is configured to bias said elbow portion of said U-shaped portion of said first decoy arm to actively engage said first decoy arm notch and to securely hold said first decoy arm in a deployed position;

said U-shaped portion of said second decoy arm is configured to bias said elbow portion of said U-shaped portion of said second decoy arm to actively engage said second decoy arm notch and to securely hold said second decoy arm in a deployed position.

11. The system as claimed in claim 1, wherein said first channel includes said third decoy arm notch;

said second channel including a fourth decoy arm notch;

said elbow portion of said U-shaped portion of said first decoy arm being configured to engage said third decoy arm notch and to secure said first decoy arm in an undeployed position;

said elbow portion of said U-shaped portion of said second decoy arm being configured to engage said fourth decoy arm notch and to secure said second decoy arm in an undeployed position.

12. The system as claimed in claim 11, wherein said U-shaped portion of said first decoy arm is configured to bias said elbow portion of said U-shaped portion of said first decoy arm to actively engage said third decoy arm notch and to securely hold said first decoy arm in an undeployed position;

said U-shaped portion of said second decoy arm is configured to bias said elbow portion of said U-shaped portion of said second decoy arm to actively engage said fourth decoy arm notch and to securely hold said second decoy arm in an undeployed position.

* * * * *